United States Patent
Postma et al.

(10) Patent No.: US 10,988,380 B2
(45) Date of Patent: Apr. 27, 2021

(54) PLANT AND PROCESS FOR PRODUCING NITRIC ACID

(71) Applicant: Stamicarbon B.V., Sittard (NL)

(72) Inventors: Leonardus Hubertus Postma, Sittard (NL); Maria Paz Muñoz López, Sittard (NL); Martinus Voorwinden, Sittard (NL)

(73) Assignee: Stamicarbon B.V., Sittard (NL)

(*) Notice: Subject to any disclaimer, the term of this patent is extended or adjusted under 35 U.S.C. 154(b) by 0 days.

(21) Appl. No.: 16/732,081

(22) Filed: Dec. 31, 2019

(65) Prior Publication Data

US 2020/0131039 A1    Apr. 30, 2020

Related U.S. Application Data

(62) Division of application No. 15/768,510, filed as application No. PCT/NL2017/050619 on Sep. 19, 2017, now Pat. No. 10,556,796.

(30) Foreign Application Priority Data

Sep. 16, 2016 (EP) ..................................... 16189488
Dec. 23, 2016 (EP) ..................................... 16206640

(51) Int. Cl.
*B01D 53/86* (2006.01)
*B01D 53/00* (2006.01)
(Continued)

(52) U.S. Cl.
CPC ............ *C01B 21/40* (2013.01); *B01D 53/002* (2013.01); *B01D 53/8625* (2013.01);
(Continued)

(58) Field of Classification Search
CPC ....... C01B 21/40; C01B 21/26; B01D 53/002; B01D 53/8631; B01D 53/1493;
(Continued)

(56) References Cited

U.S. PATENT DOCUMENTS

| | | | | | |
|---|---|---|---|---|---|
| 3,467,492 | A | * | 9/1969 | Newman | B01D 53/8628 423/239.1 |
| 3,542,510 | A | * | 11/1970 | Negra | C01B 21/26 423/392 |
| 3,897,539 | A | * | 7/1975 | Fleming | B01D 53/8625 423/235 |
| 3,927,182 | A | * | 12/1975 | Powell | C01B 21/26 423/392 |

(Continued)

FOREIGN PATENT DOCUMENTS

| | | |
|---|---|---|
| CA | 572124 | 3/1959 |
| CN | 104566405 A * | 4/2015 |

(Continued)

OTHER PUBLICATIONS

Machine translation of CN104566405A (Year: 2020).*
International Search Report and Written Opinion for PCT/NL2017/050619, dated Nov. 28, 2017, 10 pages.

*Primary Examiner* — Huy Tram Nguyen
(74) *Attorney, Agent, or Firm* — Leason Ellis LLP

(57) ABSTRACT

Disclosed is a dual pressure plant for the production of nitric acid on the basis of the oxidation of ammonia. The plant comprises a reactor configured to produce a burner gas stream; a gas cooling section configured to form a cooled burner gas; a condensation section configured to form an aqueous nitric acid condensate and an uncondensed nitrogen oxides gas stream; an absorption section configured to produce raw nitric acid and a tail gas; and a tail gas treatment system configured to form a purified tail gas. In a tail gas heating section a further heat exchanger configured to receive heat from the burner gas stream, said further heat exchanger being positioned relatively close to the reactor.

6 Claims, 1 Drawing Sheet

(51) Int. Cl.
  *C01B 21/40* (2006.01)
  *C01B 21/26* (2006.01)
  *B01D 53/14* (2006.01)

(52) U.S. Cl.
  CPC .......... B01D 53/8631 (2013.01); C01B 21/26 (2013.01); *B01D 53/14* (2013.01); *B01D 53/1493* (2013.01); *B01D 2252/103* (2013.01); *B01D 2257/404* (2013.01); *Y02C 20/20* (2013.01)

(58) Field of Classification Search
  CPC ........ B01D 2252/103; B01D 2257/404; B01D 53/14; B01D 53/8625; Y02C 20/20
  USPC ........................................................ 422/187
  See application file for complete search history.

(56) References Cited

U.S. PATENT DOCUMENTS

| | | | |
|---|---|---|---|
| 4,087,250 A * | 5/1978 | Laue | B01D 53/8625 422/171 |
| 4,263,267 A | 4/1981 | Henckens et al. | |
| 4,869,890 A * | 9/1989 | Adams | C01B 21/26 423/392 |
| 7,258,849 B2 | 8/2007 | Dziobek et al. | |
| 2011/0165050 A1 | 7/2011 | Maurer et al. | |

FOREIGN PATENT DOCUMENTS

| | | |
|---|---|---|
| DE | 10 2008 027 232 | 9/2009 |
| WO | WO-03/070634 | 8/2003 |

\* cited by examiner

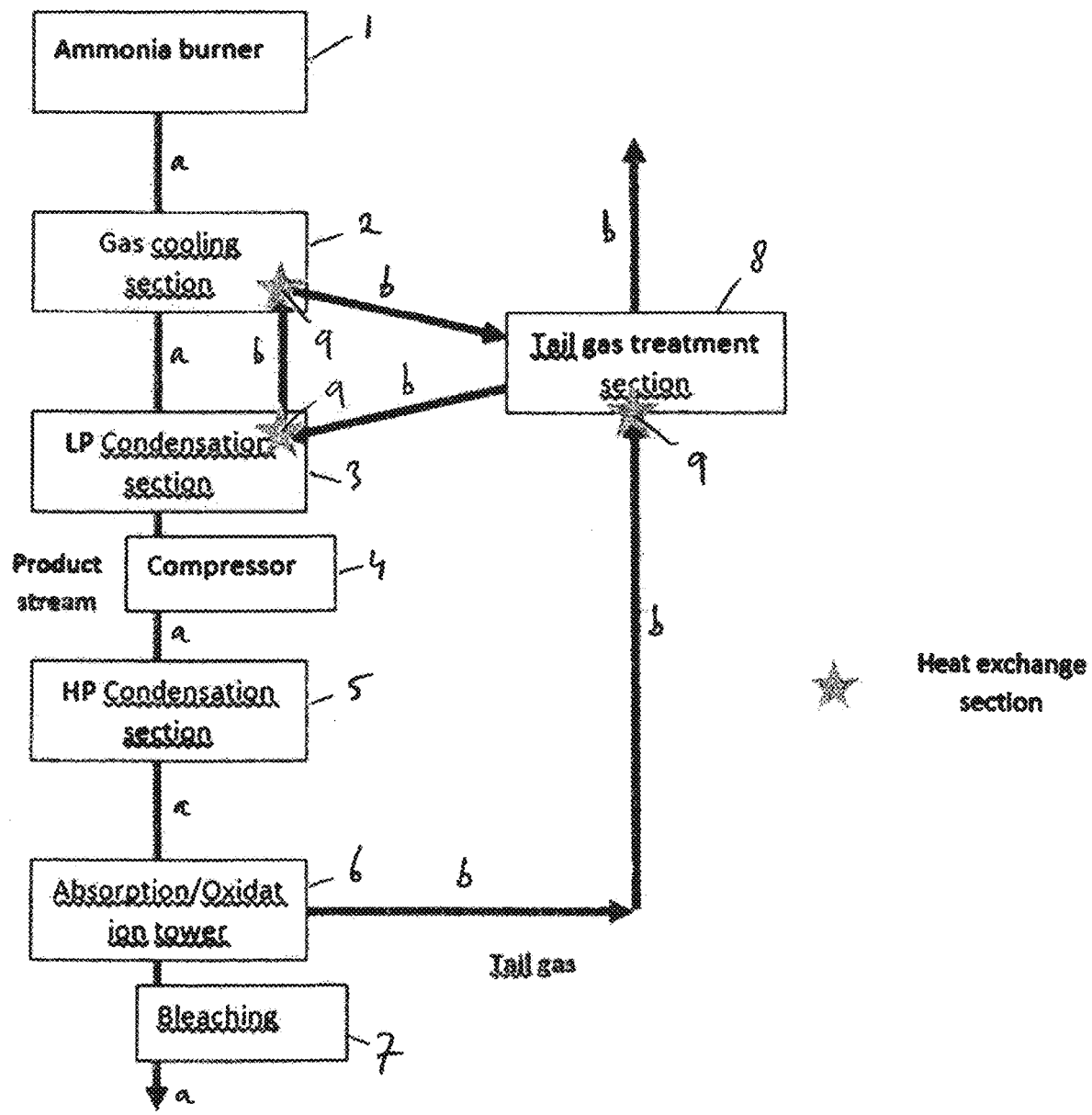

PLANT AND PROCESS FOR PRODUCING NITRIC ACID

CROSS-REFERENCE TO RELATED APPLICATIONS

This application is a divisional of U.S. application Ser. No. 15/768,510 having an international filing date of 19 Sep. 2017, which is the national phase of PCT application PCT/NL2017/050619 having an international filing date of 19 Sep. 2017, which claims benefit of European patent application Nos. 16189488.6 filed 19 Sep. 2016, and 16206640.1 filed 23 Dec. 2016. The contents of the above patent applications are incorporated by reference herein in their entirety.

FIELD OF THE INVENTION

The invention pertains to a plant for the production of nitric acid by means of a dual pressure process. The invention also pertains to a process for the production of nitric acid, and particularly to a method of treating tail gas produced by a dual pressure process for the production of nitric acid.

BACKGROUND

The preparation of nitric acid generally starts with oxidizing ammonia with air over a catalyst, so as to produce nitric oxide (NO). The process continues with oxidizing NO to nitrogen dioxide ($NO_2$). Nitrogen dioxide will form nitric acid with water. The corresponding reaction equations are as follows:

$$4NH_3 + 5O_2 \rightarrow 4NO + 6H_2O \quad (1)$$

$$2NO + O_2 \rightarrow NO_2 \quad (2)$$

$$3NO_2 + H_2O \rightarrow 2HNO_3 + NO \quad (3)$$

In the nitric acid production process, the formation of the acid from nitrogen dioxide occurs in two instances. The nitrogen oxides gas stream obtained from the oxidation of ammonia, which also comprises water as formed in the oxidation of ammonia, is subjected to condensation. Thereby a part of the nitrogen dioxide forms nitric acid. Further, the remaining nitrogen dioxide is subjected to absorption in water, so as to complete the formation of nitric acid. In order for a maximum amount of the nitrogen dioxide $NO_2$ obtained to be absorbed by water, the absorption is generally effected at elevated pressure, preferably at pressures between 4 and 14 bar. In the absorption section also oxygen is added, such as in the form of air, in order to allow nitrogen oxide (NO) to form nitrogen dioxide. Non absorbed nitrogen oxides (NO and/or $NO_2$, generally indicated as NOx) as well as $N_2O$, formed as by product of the oxidation of ammonia, result in a tail gas which is purified and vented into the atmosphere in conventional manner via a stack. A general reference is Behr, A., 2002. Ullmann's Encyclopedia of Industrial Chemistry, Vol. 6, Wiley-VCH, Weinheim.

The oxygen required for the conversion of the ammonia used as the raw material is generally supplied in the form of air. For the purpose of supply, the process air is compressed in a compressor and brought to a pressure appropriate for the oxidation reaction. Optionally, the formed NOx gas can be compressed by a second compressor to an appropriate pressure for the absorption reaction.

Modern nitric acid plants are operated under pressure in order to achieve higher acid concentrations and higher absorption rates of NOx (i.e. better efficiencies) in the absorption. A distinction is made between two-pressure and one-pressure plants. In the one-pressure process, both the combustion and the absorption are performed at moderate pressure (<8 bar) or high pressure (>8 bar). In the two-pressure (dual pressure) plants, the gas production, i.e. the production of the nitrous gases by oxidation of ammonia, is effected under a pressure of about 4 to 6 bar, and the absorption of the nitrous gases thus obtained with water to give nitric acid typically at 8 to 12 bar. The pressure is generated using compressors which are driven by means of a gas and/or steam turbine or electric motor. A gas turbine is preferably operated utilizing the energy of the off-gas of the nitric acid plant using the pressure applied by the at least one compressor.

A plant for the production of nitric acid based on the aforementioned oxidation of ammonia, generally comprises the following sections:

- a burner section (i.e. a reactor comprising a combustion chamber) wherein a gas mixture of ammonia and air are reacted so as to form a burner gas stream; the burner gas stream comprises nitrogen dioxide formed by oxidation of nitrogen oxide, and further an amount of non-oxidized nitrogen oxide, nitrous oxide ($N_2O$) as a by-product, as well as possibly $N_2$ as a by-product, and water obtained from the oxidation of ammonia;
- a gas cooling section wherein the burner gas stream is subjected to cooling, so as to form a cooled burner gas stream, and generally raising steam;
- a condensation section wherein said cooled burner gas stream is subjected to condensation, so as to form a nitric acid solution and an uncondensed nitrogen oxides (NOx) gas stream;
- an absorption/oxidation section; therein the nitrogen oxides gas stream is subjected to absorption in water so as to form a raw nitric acid product stream and a nitrogen oxides tail gas comprising $NO_x$ (nitrogen oxide and nitrogen dioxide) nitrous oxide ($N_2O$), and typically also $N_2$ and any excess oxygen; preferably in this section the gas is provided with a residence time allowing NO to be further oxidized into $NO_2$;
- a tail gas treatment section, comprising a tail gas heating zone, a nitrogen oxides ($NO_x$ and $N_2O$) gas removal zone, an expansion zone and a heating zone, wherein the nitrous gas is subjected to purification so as to form a purified tail gas, said purified tail gas being subjected to expansion. Thereby the expanded purified tail gas is vented into the atmosphere. The expansion produces work that is generally put to use in driving a turbine (which serves, next to a steam turbine utilizing steam generated in the process, and/or a gas turbine), to drive one or more compressors. This typically refers to an air compressor employed in providing air to the oxidation process and/or to an NOx compressor: these compressors can be combined as a single apparatus, or e.g. be two different sections connected to a single driveshaft.

In general, a nitric acid production process generates a high amount of process heat, and nitric acid production plants are set-up such as to make optimal use of the process heat, and in addition produce steam which can be exported to other plants on site. Thus, to the extent appropriate, heat exchange takes place between various gas streams, both of the nitric acid production circuit (i.e., process gases) and of an energy circuit (i.e., steam).

It is desired in the art to further improve the energy usage in a nitric acid production plant. Also, it is desired to further reduce the content of nitrous gases vented into the atmosphere.

SUMMARY OF THE INVENTION

The invention, in one aspect, provides a plant for the production of nitric acid comprising:
(a) a reactor comprising at least one gas inlet for ammonia and compressed air, typically for a mixture of ammonia and compressed air, a combustion chamber provided with an ammonia combustion catalyst and configured to produce a burner gas stream comprising nitrogen oxides resulting from the combustion of ammonia and subsequent oxidation, and a gas outlet for burner gas;
(b) a gas cooling section having a gas inlet which is in fluid communication with the outlet for burner gas of the reactor, said gas cooling section being configured to subject the burner gas stream to cooling, so as to form a cooled burner gas, the gas cooling section comprising a steam circuit heat exchanger configured to transfer heat from the burner gas stream to a steam circuit so as to generate superheated steam, and a gas outlet for cooled burner gas;
(c) a condensation section having a gas inlet which is in fluid communication with the outlet for cooled burner gas of the gas cooling section, said condensation section being configured to subject the cooled burner gas to condensation so as to form an aqueous nitric acid condensate and an uncondensed nitrogen oxides gas stream, said condensation section having a liquid outlet for the aqueous nitric acid condensate and a gas outlet for the uncondensed nitrogen oxides gas stream;
(d) an absorption section having a gas inlet which is in fluid communication with the gas outlet of the condensation section, said absorption section being configured to subject the nitrogen oxides gas stream to absorption in water, optionally in the form of a dilute nitric acid solution; said absorption section further comprising a liquid inlet which is in fluid communication with the liquid outlet of the condensation section and a gas outlet for tail gas;
(e) a tail gas treatment system comprising a tail gas heating section, a nitrous gas removal section, and an expansion section, said tail gas treatment system being configured to subject nitrogen oxides gas to purification so as to form a purified tail gas and to subject said purified tail gas to expansion, said tail gas treatment section comprising a gas inlet for tail gas and a gas outlet for purified tail gas;
wherein the tail gas heating section comprises a heat exchanger configured to receive heat from the burner gas stream, said heat exchanger being positioned downstream of the steam circuit heat exchanger, and upstream of the gas outlet for cooled burner gas, and preferably within the reactor.

In another aspect, the invention presents a dual pressure process for producing nitric acid comprising reacting a gas mixture of ammonia and air in a burner section thereby forming a burner gas stream; cooling said burner gas stream in a gas cooling section forming a cooled burner gas; condensing said cooled burner gas stream in a condensation section forming an aqueous nitric acid condensate and an uncondensed nitrogen oxides gas stream; feeding said aqueous nitric acid condensate and said uncondensed nitrogen oxides gas stream to an absorption/oxidation section, forming a raw nitric acid product stream and a tail gas: treating said tail gas in a tail gas treatment section, comprising a tail gas heating section, a nitrous gas removal section, and an expansion section, thereby forming a purified tail gas; releasing said purified tail gas to the atmosphere; the process comprising heating the tail gas in the gas cooling section to a temperature greater than 460° C.

In yet another aspect, the invention provides a method of modifying a pre-existing plant for the production of nitric acid, said plant comprising the equipment parts (a)-(e) as defined above, wherein the modifying comprises adding to the tail gas heating section a heat exchanger configured to receive heat from the burner gas stream, said heat exchanger being positioned downstream of the steam circuit heat exchanger, preferably directly downstream thereof, and upstream of the gas outlet for cooled burner gas.

DETAILED DESCRIPTION

In a broad sense, the invention is based on the judicious insight to directly use the heat still available, after the generation of superheated steam, from burner gas formed by the combustion of ammonia, for further raising the temperature of nitrogen oxides tail gas obtained from nitric acid production. Particularly, thereby said tail gas is heated to a temperature higher than conventionally achieved, viz. greater than 460° C., such as greater than 475° C., for example about 485° C.

This has several advantages that are of importance in a process for the production of nitric acid on the basis of combustion of ammonia, and particularly in a process of the dual pressure type. In a dual pressure process, the above-mentioned absorption section is operated under a pressure generally higher than that in the reactor. In order to achieve this pressure, a compressor is normally provided. This compressor can be driven by work available from the expansion of tail gas. In the present invention, the increased temperature of the tail gas results in a higher amount of kinetic energy available from expanding such tail gas, which results in a more energy-efficient driving of the compressor. Generally, thereby air, typically heated and filtered, is compressed to, e.g., 5 bar in a turbomachinery train section. Turbomachinery trains of dual pressure nitric acid plants consist of an axial air compressor, a radial NOx compressor, a tail gas expander and a steam turbine.

The invention pertains to a novel set-up of the tail gas treatment section of a nitric acid production plant, as well as to a novel tail gas treatment in a nitric acid production process. This is hereinafter further discussed with reference to the various section of such a plant, and the corresponding process steps.

The novel tail gas treatment is applicable to a process of the invention, as well as to the plant thereby used. In general it is noted that the novel modification of the invention pertains to the section of a nitric acid plant in which burner gas obtained from ammonia combustion is cooled, and to the combination thereof with the treatment of tail gas. Apart from this novel modification, the nitric acid production plant can be of a conventional set-up, and such a plant can be built and used by persons skilled in the art without further elucidation. Particularly, the plant is configured as a dual pressure plant, allowing the reactor and the absorption section to be operated at different pressures, typically of 4-6 bar in the reactor, and 10-15 bar in the absorption section. As explained above, in operating such a plant, the temperature increase of the tail gas is of additional advantage. In an interesting embodiment the reactor and, optionally, part of the gas cooling section, are operated at a lower pressure than the absorption/oxidation section and the tail gas treatment section.

The reactor can by any suitable reactor for the oxidation of ammonia. The reactor comprises at least one gas inlet for ammonia and compressed air. This can be a single inlet for ammonia and air that have been mixed prior to entry into the reactor, it can be single inlet for an alternating feed of ammonia and compressed air. Also, the reactor can have separate inlets for ammonia and compressed air. Such a reactor, including systems of more than one reactor, such as positioned in parallel, is sometimes referred to as ammonia burner, an ammonia burning section, an ammonia combustion reactor, and the like. Particularly, the reactor comprises a burner hood, a gas distributor, at least one catalyst gauze, or a plurality of catalyst gauzes, and optionally a basket. Typically, the reactor will comprise a combustion chamber in which a suitable catalyst is placed. Catalysts for the oxidation of ammonia are known to the skilled person, and will generally comprise a noble metal. A typical way of providing the catalyst is by means of one or more wire gauzes, such as a stack of wire gauzes, placed inside the reactor, such as in the combustion chamber. A preferred metal catalyst is a combination of platinum and rhodium, such as a pack of platinum-rhodium gauzes, e.g. produced by knitting thin wires. The reactor comprises the conventional operation equipment. The reactor comprises a gas inlet for ammonia and a gas inlet for compressed air, and is configured to produce a burner gas stream comprising nitrogen oxides resulting from the combustion of ammonia. The appropriate equipment is well-known in the art. In operation, the reactor serves perform the chemical reactions according to equations (1) and (2) above. It is also conceivable that the reactor itself serves to produce NO, whilst the subsequent oxidation of NO to $NO_2$ is conducted downstream of the reactor.

The term downstream is hereby used with reference to the order of chemical events in the nitric acid production process. I.e., the formation of $NO_2$ takes place downstream of the oxidation of ammonia to NO, and the formation of $HNO_3$ takes place downstream of the oxidation of NO to $NO_2$.

Downstream of the reactor, optionally via additional equipment such as a unit for the oxidation of nitric oxide to nitrogen dioxide, a gas cooling section is provided. Said unit for oxidation can, e.g, function by providing residence time to the NOx gas allowing NO to convert into NO2. This section has a gas inlet which is in fluid communication (directly or indirectly) with the outlet for burner gas of the reactor. The gas cooling section can have a conventional set-up, e.g. comprising one or more shell and tube heat-exchangers. The heat exchangers are configured such as to have a heat transfer contact between the gas stream resulting from the chemical conversion in the plant (i.e., the process gas stream) and a service medium, typically water or steam, generally provided as a separate flow system or circuit in the plant. This heat exchanger is referred as a steam circuit heat exchanger. The gas cooling section can comprise one or more of such steam circuit heat exchangers. The heat exchange to the steam circuit will generally be used to generate superheated steam, and the one or more heat exchangers are sometimes also referred to as a superheater. In an interesting embodiment, the gas cooling section further comprises a third heat exchanger which is a steam evaporator for raising steam and a fourth heat exchanger which is an economizer.

The process gas stream being cooled as a result of heat exchanger, the output of the gas cooling section is referred to as cooled burner gas, for which the gas cooling section has a gas outlet which is in fluid communication, directly or indirectly, with the next downstream section, viz. a condensation section.

The condensation section thus has a gas inlet which is in fluid communication with the outlet for cooled burner gas of the gas cooling section. In the process of production of nitric acid on the basis of the oxidation of ammonia, the gas stream resulting from the oxidation, i.e. the burner gas, will necessarily comprise water, as is formed as a result of the reaction of ammonia and oxygen. It will be understood that, in water, nitrogen dioxide forms nitric acid. The condensation section is configured to allow this to happen by subjecting the cooled burner gas, which comprises water vapor, to condensation. This condensation results in an aqueous nitric acid condensate, which is typically called weak nitric acid. With reference to the conditions for condensing water-vapors, it will be understood that the kinds and amounts of gases that do not participate in the formation of the aqueous nitric acid condensate, will remain in the gas phase. This refers particularly to the uncondensed nitrogen oxides comprising any excess nitrogen dioxide, nitric oxide, comprising nitric oxide formed in the reaction between nitrogen dioxide and water, as well as any non-oxidized nitric oxide originally present, and nitrous oxide. The condenser accordingly has a liquid outlet for the aqueous nitric acid condensate and a gas outlet for the uncondensed nitrogen oxides gas stream. The condensation section can be a conventional condensation apparatus. e.g. a shell- and tube condenser.

In an interesting embodiment, the condensation section comprises a low pressure condensation section and a high pressure condensation section wherein the nitrous gas stream leaving the low pressure condensation section is compressed prior to feeding to the high pressure condensation section.

Thereby preferably an expander is used, which has the benefit of reducing steam consumption. The expander is associated with a compressor that serves to increase the pressure in the condensation section. Accordingly, the low-pressure condensation section comprises a tail gas heater and a low-pressure cooler/condenser. The nitrogen oxides stream leaving the low-pressure section is sent to a high-pressure condensation section via a compressor. This compressor is placed between the gas cooling section (the low pressure cooling/condensing section) and the high pressure condensation section. The high-pressure condensation section comprises a high-pressure nitrogen oxides gas cooler and a high-pressure cooler/condenser. The acid product stream leaving the high-pressure condensation section is sent to the absorption/oxidation section.

Preferably, the cooled burner gas entering the condensation section has a temperature between 170° C. and 190° C. for example 180° C.

In order to complete the formation of nitric acid also on the basis of the excess nitrogen dioxide not condensed with water, the nitrogen oxides gas stream obtained from the condenser, is subsequently subjected to absorption in a suitable aqueous liquid. Prior to the absorption the gas is preferably given residence time allowing further oxidation of NO into $NO_2$. The aqueous liquid can be water as such, but it can also be a dilute nitric acid solution. In the latter case, as a result of the absorption of nitrogen dioxide, the dilute nitric acid solution will become a more concentrated nitric acid solution. Preferably, the heat of absorption is removed by cooling water, typically on the trays of an absorption column. The absorption is conducted in the absorption section. This section has, accordingly a gas inlet which is, directly or indirectly, in fluid communication with the gas outlet of the condensation section. It will be understood that by the absorption in water nitrogen dioxide is allowed to form nitric acid. In a nitric acid production process of the dual pressure type, this section is operated under a pressure of generally 10-14 bara. The term "dual pressure" acknowledges that the production process uses different pressures in the reactor (e.g., 4-6 bara) and in the absorption section. The absorption section, which typically comprises an absorption column, preferably functions also as an oxidation section, in order to allow further nitrogen dioxide to be formed from the nitric oxide that is inevitably present, e.g. as a result of the reaction between nitrogen dioxide and water. To this end, e.g., a secondary air stream is introduced into the absorption column so as to re-oxidize the NO that is formed in reaction (3). This secondary air also removes NO2 from the product acid.

The aqueous nitric acid condensate obtained in the condenser is fed, directly or indirectly, to the absorption section. To this end the absorption section comprises a liquid inlet which is in fluid communication with the liquid outlet of the condensation section. The absorption section, such as an absorption/oxidation section, produces a raw nitric acid product stream and a nitrogen oxides tail gas. The tail gas comprises $NO_x$ (non-oxidized nitrogen oxide and non-reacted nitrogen dioxide) and nitrous oxide ($N_2O$). Accordingly, the absorption section comprises a gas outlet for the nitrogen oxides tail gas.

It will be understood that the tail gas presents an ongoing challenge, both for economical and for environmental reasons. For economic reasons, it would be desired for any amount of nitric oxide to be converted to nitrogen dioxide, for any amount of nitrogen dioxide to be converted to nitric acid, and for the amount of nitrous oxides to be as low as possible. For environmental reasons, it will be immediately understood that it is desired to reduce the amount of nitrogen oxides to be released into the atmosphere as much as possible.

The tail gas treatment generally comprises heating of the tail gas and subjecting this to catalytic reduction. Accordingly, tail gases are reacted with ammonia under the influence of a catalyst, such as a non-noble metal catalyst, according to reaction equation 4, under the formation of nitrogen and water vapor, which can be safely released into the atmosphere.

$$NO+NO_2+2NH_3 \rightarrow 2N_2+3H_2O \quad (4)$$

The increased temperature of the tail gas emitted by the plant of the invention, as produced in the process of the invention, has the advantage that a lower amount of catalyst can be used for the catalytic conversion. As a result, the equipment needed for the tail gas treatment can be smaller, which has several advantages, such as a reduction of capital and operational expenses, and the fact that use of natural gas is not required.

In an interesting embodiment of the invention, a higher energy efficiency is achieved by allowing the tail gas to pass at least three heat exchange zones. Accordingly, heat is exchanged:
  in the gas cooling section between the burner gas stream coming from the reactor and the tail gas coming from the condensation section;
  in the tail gas treatment section between the tail gas stream coming from the gas cooling section and tail gas coming from the absorption/oxidation tower;
  in the condensation section between the nitrogen oxides gas stream coming from the gas cooling section and the tail gas stream coming from the tail gas treatment section.

Without wishing to be bound by theory, the inventors believe a higher energy efficiency as described above to result from the following. The present configuration allows optimal heat exchange, which leads to more steam generated while less heat is lost to cooling water. Due to the higher temperature of the tail gas leaving the tail gas treatment (NOx abatement) system, the expander can generate more energy. The section exchanging heat between the tail gas coming from the expander and the tail gas coming from the absorption/oxidation section, results in a lower temperature of the tail gas sent to the stack.

Further, in the invention the increased tail gas temperature makes the NOx abatement more efficient. No auxiliary natural gas needs to be added to the $N_2O$/NOx abatement system to achieve low $N_2O$ numbers.

Also, the tail gas leaving the heat exchanger within the burner section has a higher temperature due to close-placement of said exchanger to the superheater.

In this respect, in a preferred embodiment of the plant of the invention, the reactor, the steam circuit heat exchanger, and the further heat exchanger are integrated into one single apparatus.

It will be understood that the single apparatus, in which the reactor and said heat exchangers are integrated, refers to a piece of equipment in which the integrated parts are confined, i.e., held within a single confinement, generally within the same housing, said housing being provided with the appropriate inlets and outlets for gases and liquids.

In another interesting embodiment, the heat exchangers are provided as two apparatuses. This facilitates reducing the height of the equipment.

The tail gas leaves said heat exchanger at a higher temperature. The $N_2O$/NOx abatement system works at a higher temperature, thus the expander is working with a higher efficiency rate. Particularly, the expander produces more power at the higher temperature than in the event of working at a lower temperature. The tail gas leaving the expander is sent to the heater, the heated tail gas is sent to the condensation section, while the cooled tail gas is sent to the stack.

Typical tail gas content achievable is:
  $NO_x$ emissions: 20 ppm (max 25 ppm)
  $N_2O$ emissions: 20 ppm (max 100 ppm).

The heat exchanger's network results in low temperature inlet of the condensation section (below 180° C. preferably below 170° C., e.g. 165° C.). This has the advantage of preventing corrosion as result of condensation/re-evaporation.

Moreover, nitrogen oxides gas entering the condensation section has a lower temperature, which serves to avoid corrosion in the condensation section.

Due to the heat exchanger's arrangement, the heat exchange area can be reduced, and the available temperature differences are more optimally used.

The heat exchanger (nitrous gas-tail gas) in the gas cooling section is preferably a vertical heat exchanger. The vertical placement means that at start-up, no acid remains in the tubes, therefore there is a minimum corrosion risk because of self-drainage in the tubes of the vertical heat exchanger.

The higher temperature of the NOx gas entering the low pressure cooler/condenser prevents condensation/re-evaporation in the inlet of the heat exchanger in the condensation section.

In sum, the invention provides a dual pressure plant for the production of nitric acid on the basis of the oxidation of ammonia. The plant comprises a reactor configured to produce a burner gas stream: a gas cooling section configured to form a cooled burner gas; a condensation section configured to form an aqueous nitric acid condensate and an uncondensed nitrogen oxides gas stream; an absorption section configured to produce raw nitric acid and a tail gas; and a tail gas treatment system configured to form a purified tail gas. In a tail gas heating section a further heat exchanger configured to receive heat from the burner gas stream, said further heat exchanger being positioned relatively close to the reactor. The process of the invention preferably is a dual pressure process with an integrated tail gas heater directly below the steam superheater in the same reactor. The location of the tail gas heater in combination with the higher tail gas temperature going into the deNOx system (i.e. the system for the removal of nitrogen oxides) results in the following efficiencies: good removal in deNOx without the need for methane in deNOx (which is used in the art. e.g. U.S. Pat. No. 7,393,512), smaller equipment, more export steam, low emissions, higher energy recovery from expansion. A further benefit is a reduced corrosion rate. Particularly, whilst providing optimally low NOx emissions, the process of the invention provides an optimally high energy efficiency.

BRIEF DESCRIPTION OF THE DRAWING

The invention is hereinafter illustrated with reference to the FIGURE. FIG. 1 is a schematic drawing highlighting the preferred position of the tail gas treatment section in terms of the process and heat streams applicable to the invention.

EQUIPMENT PARTS (1) Reactor
(2) Gas cooling section
(3) Low pressure condensation section
(4) Compressor
(5) High pressure condensation section
(6) Absorption/oxidation tower
(7) Bleaching section
(8) Tail gas treatment section
(9) Heat exchange sections
Streams:
(a) Product stream
(b) Tail gas

The invention claimed is:

1. A dual pressure process for producing nitric acid comprising reacting a gas mixture of ammonia and air in a burner section thereby forming a burner gas stream; cooling said burner gas stream in a gas cooling section forming a cooled burner gas; condensing said cooled burner gas stream in a condensation section forming an aqueous nitric acid condensate and an uncondensed nitrogen oxides gas stream; feeding said aqueous nitric acid condensate and said uncondensed nitrogen oxides gas stream to an absorption/oxidation section, forming a raw nitric acid product stream and a tail gas; treating said tail gas in a tail gas treatment section, comprising a tail gas heating section, a nitrous gas removal section, and an expansion section, thereby forming a purified tail gas; releasing said purified tail gas to the atmosphere; the process comprising heating the tail gas in the gas cooling section to a temperature greater than 460° C., said process performed in a plant comprising:

(a) a reactor comprising at least one gas inlet for ammonia and compressed air, a combustion chamber provided with an ammonia combustion catalyst and configured to produce a burner gas stream comprising nitrogen oxides resulting from the combustion of ammonia and subsequent oxidation, and a gas outlet for burner gas;

(b) a gas cooling section having a gas inlet which is in fluid communication with the outlet for burner gas of the reactor, said gas cooling section being configured to subject the burner gas stream to cooling, so as to form a cooled burner gas, the gas cooling section comprising a steam circuit heat exchanger configured to transfer heat from the burner gas stream to a steam circuit so as to generate superheated steam, and a gas outlet for cooled burner gas;

(c) a condensation section having a gas inlet which is in fluid communication with the outlet for cooled burner gas of the gas cooling section, said condensation section being configured to subject the cooled burner gas to condensation so as to form an aqueous nitric acid condensate and an uncondensed nitrogen oxides gas stream, said condensation section having a liquid outlet for the aqueous nitric acid condensate and a gas outlet for the uncondensed nitrogen oxides gas stream;

(d) an absorption section having a gas inlet which is in fluid communication with the gas outlet of the condensation section, said absorption section being configured to subject the nitrogen oxides gas stream to absorption in water, optionally in the form of a dilute nitric acid solution; said absorption section further comprising a liquid inlet which is in fluid communication with the liquid outlet of the condensation section and a gas outlet for nitrogen oxides tail gas;

(e) a tail gas treatment system comprising a tail gas heating section, a nitrous gas removal section, and an expansion section, said tail gas treatment system being configured to subject nitrogen oxides gas to purification so as to form a purified tail gas and to subject said purified tail gas to expansion, said tail gas treatment section comprising a gas inlet for nitrogen oxides tail gas and a gas outlet for purified tail gas;

wherein the tail gas heating section comprises a further heat exchanger configured to receive heat from the burner gas stream, said further heat exchanger being positioned downstream of the steam circuit heat exchanger, and upstream of the gas outlet for cooled burner gas, and wherein the reactor, the steam circuit heat exchanger, and the further heat exchanger are integrated into one single apparatus.

2. A process according to claim 1, wherein the cooled burner gas stream entering the condensation section has a temperature between 170° C. and 190° C.

3. The process according to claim 1, comprising heating the tail gas in the gas cooling section to a temperature greater than 475° C.

4. The process according to claim 3, comprising heating the tail gas in the gas cooling section to a temperature of about 485° C.

5. The process according to claim 1, wherein the burner section, the gas cooling section and the tail gas heating section are integrated into one single apparatus.

6. A method of modifying a pre-existing plant for the production of nitric acid, said plant comprising (a) a reactor comprising a gas inlet for ammonia and a gas inlet for compressed air, a combustion chamber provided with an ammonia combustion catalyst and configured to produce a burner gas stream comprising nitrogen oxides resulting from the combustion of ammonia and subsequent oxidation, and a gas outlet for burner gas;

(b) a gas cooling section having a gas inlet which is in fluid communication with the outlet for burner gas of the reactor, said gas cooling section being configured to subject the burner gas stream to cooling, so as to form a cooled burner gas, the gas cooling section comprising a steam circuit heat exchanger configured to transfer heat from the burner gas stream to a steam circuit so as to generate superheated steam, and a gas outlet for cooled burner gas;

(c) a condensation section having a gas inlet which is in fluid communication with the outlet for cooled burner gas of the gas cooling section, said condensation section being configured to subject the cooled burner gas to condensation so as to form an aqueous nitric acid condensate and an uncondensed nitrogen oxides gas stream, said condensation section having a liquid outlet for the aqueous nitric acid condensate and a gas outlet for the uncondensed nitrogen oxides gas stream;

(d) an absorption section having a gas inlet which is in fluid communication with the gas outlet of the condensation section, said absorption section being configured to subject the nitrogen oxides gas stream to absorption in water; said absorption section further comprising a liquid inlet which is in fluid communication with the liquid outlet of the condensation section and a gas outlet for nitrogen oxides tail gas;

(e) a tail gas treatment system comprising a tail gas heating section, a nitrous gas removal section, and an expansion section, said tail gas treatment system being configured to subject nitrogen oxides gas to purification so as to form a purified tail gas and to subject said purified tail gas to expansion, said tail gas treatment section comprising a gas inlet for nitrogen oxides tail gas and a gas outlet for purified tail gas;

wherein the method comprises adding to the tail gas heating section a heat exchanger configured to receive heat from the burner gas stream, said heat exchanger being positioned downstream of the steam circuit heat exchanger, and upstream of the gas outlet for cooled burner gas.

* * * * *

UNITED STATES PATENT AND TRADEMARK OFFICE
CERTIFICATE OF CORRECTION

PATENT NO. : 10,988,380 B2
APPLICATION NO. : 16/732081
DATED : April 27, 2021
INVENTOR(S) : Leonardus Hubertus Postma et al.

It is certified that error appears in the above-identified patent and that said Letters Patent is hereby corrected as shown below:

On the Title Page

Item (30), the Foreign Application Priority Data information:
"Foreign Application Priority Data
Sep. 16, 2016 (EP) .............................. 16189488
Dec. 23, 2016 (EP) ............................. 16206640"

Should be changed as follows:
-- Foreign Application Priority Data
Sep. 19, 2016 (EP) .............................. 16189488
Dec. 23, 2016 (EP) ............................. 16206640 --

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*